July 28, 1959     J. D. PETTINATO     2,896,423
PERISHABLE FOODS DISPENSER

Original Filed Dec. 17, 1956     2 Sheets-Sheet 1

JAMES D. PETTINATO
*INVENTOR.*

BY *Robert O. Wright*

JAMES D. PETTINATO
INVENTOR.

United States Patent Office 2,896,423
Patented July 28, 1959

2,896,423

PERISHABLE FOODS DISPENSER

James Daniel Pettinato, Clayville, N.Y.

Continuation of application Serial No. 628,908, December 17, 1956. This application March 11, 1959, Serial No. 799,380

4 Claims. (Cl. 62—249)

This invention relates to a perishable food dispenser for use in restaurants, eating places and the like, and more particularly to a combination bulk milk dispenser and dessert display case and dispenser. This application is a continuation of application Serial No. 628,908, filed December 17, 1956.

For some years now it has been common practice in restaurants and other eating places to store milk in a bulk dispenser in which the milk is contained in the conventional milk can inside a refrigerated compartment and drawn off as desired through a suitable spigot or dispensing valve. These devices have contributed to greatly improved sanitation and economy in the handling of milk where it is to be dispensed in small quantities by eliminating the cumbersome small bottles, cases, and other paraphernalia for transporting and dispensing milk in individual servings. These devices have generally taken the form of rectangular boxes mounted on the counter or on the wall of the restaurant measuring some two to four feet in each dimension with a depth of twelve to eighteen inches. While a great improvement over prior methods of dispensing milk this has nevertheless been in some cases a space problem. According to the present invention I have provided a novel mechanism for utilizing the space and facilities of the bulk milk dispenser in a more economical and practical fashion without substantially increasing the space taken up thereby.

It is an object of the present invention to provide a combination bulk milk dispenser and dessert display case that does not materially increase the space occupied by a conventional bulk milk dispenser and which does not require any additional refrigerating mechanism. It is another object of the present invention to provide a dessert display and dispensing mechanism for attachment to a conventional bulk milk dispenser without substantial alterations thereof or provision of additional refrigeration capacity. It is another object of the present invention to provide a combination bulk milk dispenser and pie display case wherein the temperatures of both may be maintained at the desired levels in an economical and practical fashion. It is another object of the present invention to provide a combination bulk milk dispenser and dessert display case wherein the contents of the respective compartments are kept in the desired sanitary and refrigerated condition. It is another object of the present invention to provide a combination bulk milk cooler and perishable food display case that presents the foods in a pleasing and sanitary manner in a minimum of space and with a minimum of equipment. These and other and further objects will be in part apparent and in part pointed out as the specification proceeds.

Figure 1:
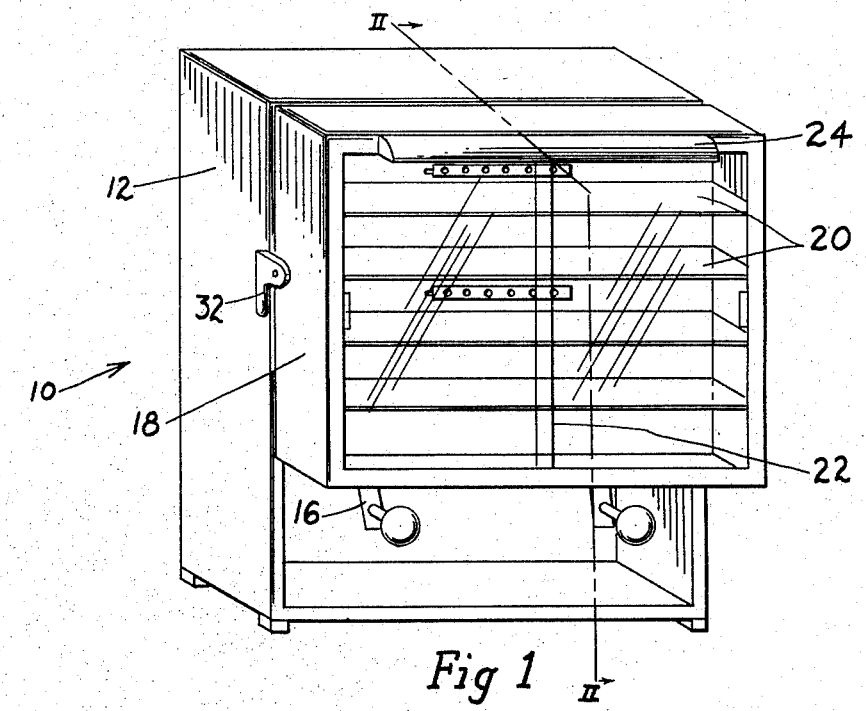
Figure 1 is a perspective view of a device according to the present invention.

Referring now to Figure 1 the perishable food dispenser 10 according to the present invention comprises generally a bulk milk dispensing portion 12 having therein a compartment 30 for storing one or more bulk milk cans 14 (in the illustration shown two milk cans) together with suitable dispensing valves 16 and a dessert dispensing and display portion 18 generally mounted on the front upper portion of the milk dispensing portion 12 which has therein a plurality of shelves 20 and a pair of glass doors 22 closing the front thereof. A suitable fluorescent or other lighting fixture 24 is provided at the top of the cabinet portion 18 to illuminate the contents thereof. The valves 16 in the milk dispensing portion 12 are adapted to control the flow of milk from the milk can 14 by selectively squeezing a collapsible tube connected to the bottom of the can, as is well known in the art.

The refrigerating apparatus such as the condenser and compressor for the dispensing mechanism 10 is positioned in a compartment 26 in the bottom of the bulk milk dispensing portion 12 and suitable louvers 28 are provided in the upper portion of the back of the dessert dispensing case to permit the cold air from the chamber 12 to circulate into the display case portion 18. Any suitable conventional evaporator may be positioned in or about the compartment 30 such as coils 42 in the walls thereof to properly cool the milk cans stored therein.

Figure 2:
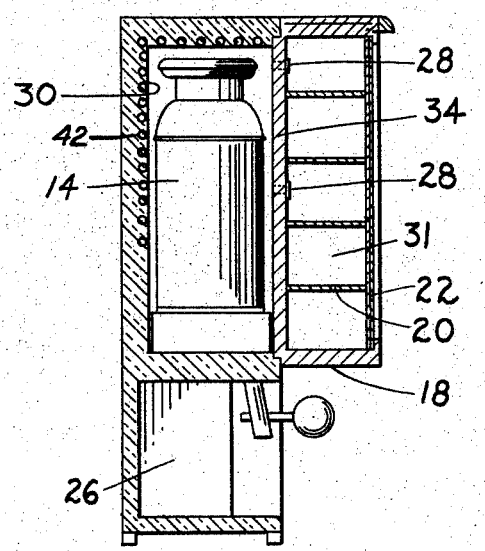
Figure 2 is a sectional view on line II—II of Figure 1.

As may be seen clearly in Figures 1 and 2 the bulk milk dispenser 12 comprises the milk chamber 30, the end, top, and bottom walls of which are fully insulated, and the front wall of which is formed by the rear wall 34 of the display mechanism 18. Wall 34 is generally constructed of metal, preferably stainless steel, and is not insulated. This back of the display case 18 is hinged at the right in Figure 1 by hinge 19 and acts as a door for the bulk milk compartment 12 with a latch mechanism 32 of any conventional type provided at the left in Figure 1 to hold the door in the closed position. The dessert dispenser 18 may have several shelves disposed therein to receive pies, custards, compotes, jellos and the like which are required by law to be kept under proper refrigeration. The open front of the cabinet 18 is closed by glass doors 20 which maintain the food in a sanitary, refrigerated condition while displaying the food to be dispensed in an attractive manner. As shown, the doors are of the sliding type and they readily move aside to permit removal of a given dessert as selected by the customer.

As mentioned above the rear wall of the display case 18 has therein a pair of louvers 28 which may be adjusted for proper circulation of the refrigerated air from chamber 30 into the case 18 so as to maintain the desserts displayed therein at the proper temperature. For instance, if the compartment 30 is maintained at thirty-five degrees for the milk in the cans 14 the display chamber portion 18 may be readily kept at about forty-five degrees Fahrenheit by the proper adjustment of the louvers 28. A certain amount of cooling is also effected by radiation through the metal wall 34 of the back of the case 18. The bottom and top and ends of the display portion 18 may be insulated as are the walls of the chamber 30 so that the heat loss through the compartment 18 is held to a minimum. In actual practice it has been found that the usual refrigerating mechanism for the milk container compartment 12 is entirely adequate to take care of the cooling requirements of the display dispenser. Thus the dispenser 18 may be added to existing mechanisms or built in as an integral part of the equipment during the initial manufacture thereof making for economical utilization of the full potentialities of the bulk milk dispenser.

From the foregoing it can be seen that by placing a thin display case member 18 on the front of the standard bulk milk cooler very little additional space is taken up and, in fact, what is normally wasted wall space is utilized for display of merchandise. Such space is normally at a premium in the average eating place and it has been found in practice that the increased sales from the display of the attractive desserts and so on in an easily seen place more than pays for the additional cost of the display and dispensing mechanism.

Figure 4:
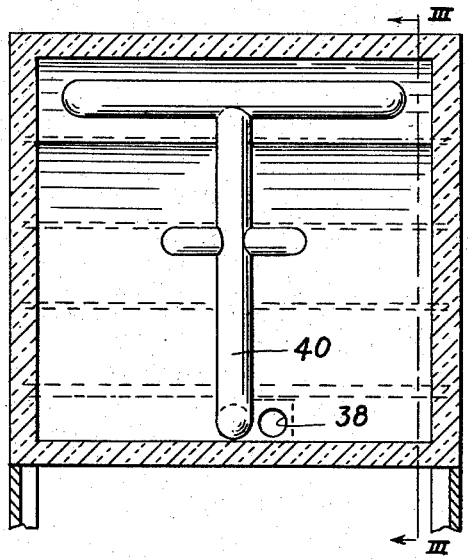
Figure 4 is a sectional view essentially on line IV—IV of Figure 3.
Figure 3:
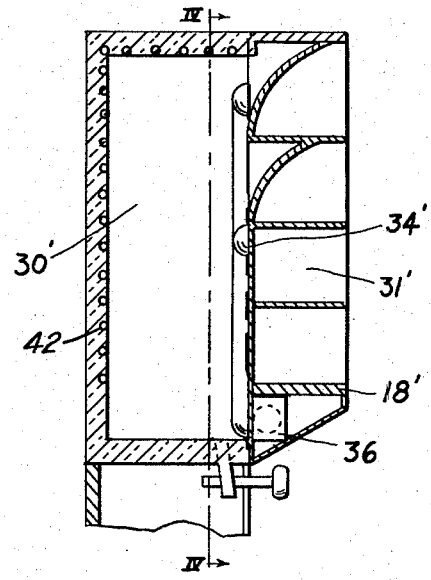
Figure 3 is a view similar to Figure 2 of another embodiment of the present invention.

Referring now to Figures 3 and 4 there is shown another embodiment of the present invention wherein the milk dispensing compartment 30′ is maintained entirely separate and sealed from the dispensing and display compartment 18′. Under certain sanitary laws the milk must be maintained in a separate container from that of other refrigerated foods and also in certain applications this method of cooling the outer cabinet is more desirable (i.e. where excessive humidity may be encountered this reduces frost build-up).

In this embodiment the cooling is effected by both conduction and radiation through the rear sheet metal wall 34′. While under normal conditions the wall 34′ is a flat sheet as wall 34, where increased cooling is desired I have found it advantageous to form the upper shelves in the curved fashion shown in Figure 3. This provides increased cooling surface in the warm air areas without materially cutting down on the display space.

In addition, the cooling may be aided by a novel air-circulating mechanism which comprises a blower device 36 positioned in the bottom the display container 18′ which communicates through hole 38 with the compartment 30′ but not the compartment 31′. The output of blower 36 is conducted into the ducts 40 which, as may be seen in Figure 4, are positioned on the back of the wall 34′ somewhat in T-shaped fashion. The ducts 40 are spot-welded or otherwise secured to the back of the wall 34′ at spaced intervals in a somewhat loose fashion so that the air circulated therethrough may leak out over the rear surface of the wall 34′ to increase the cooling effect thereover. In operation the cold air from the bottom of the chamber 30′ is drawn by the blower 36 into the lower part of the dispenser 18′, and then forced through the ducts 40 where it spills out over the back surface of the door and gradually returns back into the circulation path. This circulation may be controlled by a thermostat (not shown) to regulate the temperature in the space 31′ to the desired sanitary degree. It will be noted that the display and dispensing case 18′ again acts as a door for the chamber 30′ and seals it from the outside. It will also be noted that the actual display space 31′ is completely isolated from the chamber 30′ with no actual conduction of air therebetween.

It will be further noted that the bottom of the dispensing case 18′ has been cut off in an angular fashion which it has been found provides greater visibility and ease in dispensing milk from the chamber 30′.

Figure 5:
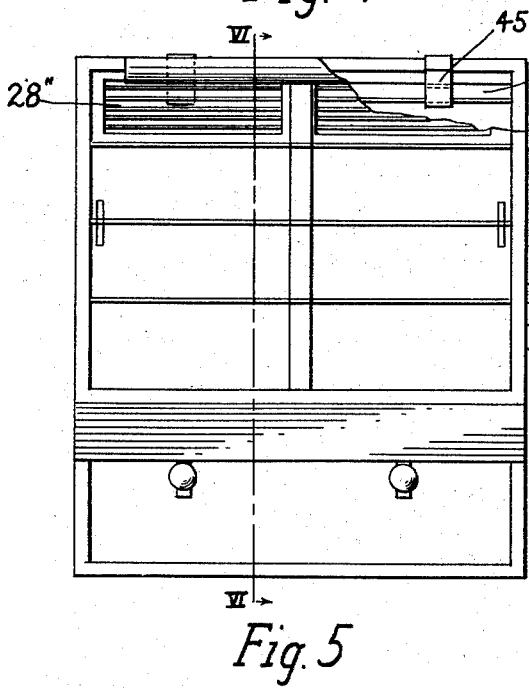
Figure 5 is a front elevation of another embodiment of the present invention.
Figure 6:
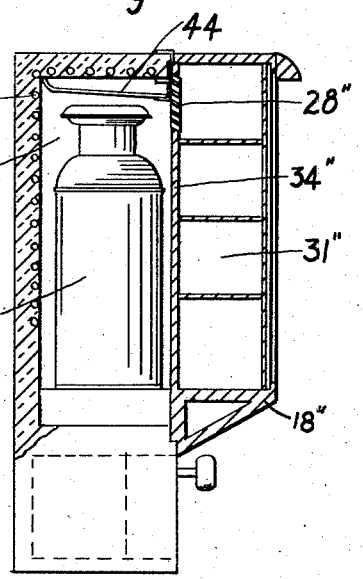
Figure 6 is a sectional view on line VI—VI of Figure 5.

Referring now to Figures 5 and 6 there is shown a still further embodiment of the present invention. As may be seen in general configuration it is essentially the same as that in the foregoing figures. In this embodiment the display and dispensing case 18″ again forms the door and closure for the bulk cooling chamber 30″. Mounted over the top of the milk cans 14″ in relatively close proximity to the top of the chamber 30″ is a plate 44 which may be fixed to the cabinet wall or the back of door 34″. In the preferred form I hang the plate 44 from the top of compartment 30″ by straps 45 fixed to plate 44 and which fit over the top edge of the compartment to properly position it relative to the coils 42. Above this plate on the back wall 34″ of the chamber 18″ there are provided louvers 28″ which communicate with the space above the milk cans 14″ defined by the partition 44. In this configuration the cooling capacity of the upper coils 42 are in effect borrowed for the cooling of the chamber 31″ to the desired degree for the proper storage of perishable foods therein.

While there are given above certain specific examples of this invention and its application in practical use, it should be understood that they are not intended to be exhaustive or to be limiting of the invention. On the contrary, these illustrations and explanations herein are given in order to acquaint others skilled in the art with this invention and the principals thereof and a suitable manner of its application in practical use, so that others skilled in the art may be enabled to modify the invention and to adapt and apply it in numerous forms each as may be best suited to the requirement of a particular use.

I claim:

1. A perishable food display case and bulk milk dispensing mechanism comprising in combination a pair of juxtaposed generally rectangular, insulated compartments; a common uninsulated partition member separating said two compartments; a plurality of cooling coils mounted in the walls of at least one of said compartments; a pair of glass sliding doors slidably mounted to form the outer wall of one of said compartments; a plurality of display members mounted in said compartment having the glass sliding door outer wall and said other compartment being adapted to receive therein at least one large milk can; valve means mounted in the bottom of said milk can receiving compartment adapted to control the flow of milk from said milk can therein; air flow means operatively associated with said common partition member for utilizing a portion of the cooled air of said milk can receiving compartment to cool said other compartment; and hinge means mounted along one edge of said common partition and latch means along the opposite edge whereby one of said compartments may be pivotally separated from the other to permit access to the interior of said other compartment.

2. The combination of claim 1 wherein said air flow means operatively associated with said common partition member comprise adjustable louvers mounted in said common partition to permit said cooled air of said milk can compartment to circulate into and cool said other compartment.

3. A device as described in claim 1 wherein said sliding door compartment has a depth greater than one-half the depth of said milk can receiving compartment, said display members comprise glass shelves, and the bottom of said sliding door compartment tapers upwardly from the back thereof to the front whereby said valve means is exposed to more ready access.

4. A device as described in claim 1 wherein said common partition includes a curvilinear portion forming at least a portion of said shelves in said sliding door compartment, and said air flow means operatively associated with said common partition comprise a circulating fan and duct members for forcibly moving said cooled air in said milk can compartment over said common partition to cool said other compartment.

References Cited in the file of this patent

UNITED STATES PATENTS

| | | |
|---|---|---|
| 2,131,680 | Zahodiakin | Sept. 27, 1938 |
| 2,627,728 | Levin | Feb. 10, 1953 |
| 2,737,029 | Krasner et al. | Mar. 6, 1956 |
| 2,785,836 | Smith et al. | Mar. 19, 1957 |